United States Patent [19]

Perez-Mendez

[11] 4,405,983

[45] Sep. 20, 1983

[54] AUXILIARY MEMORY FOR MICROPROCESSOR STACK OVERFLOW

[75] Inventor: Pedro I. Pérez-Méndez, Westminster, Colo.

[73] Assignee: Bell Telephone Laboratories, Incorporated, Murray Hill, N.J.

[21] Appl. No.: 217,571

[22] Filed: Dec. 17, 1980

[51] Int. Cl.³ .............................................. G06F 9/18
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,827,029 | 7/1974 | Schlotterer et al. | 364/200 |
| 4,091,447 | 5/1978 | Dillion et al. | 364/200 |
| 4,093,987 | 6/1978 | Gaudette et al. | 364/200 |

*Primary Examiner*—Gareth D. Shaw
*Assistant Examiner*—Daniel K. Dorsey
*Attorney, Agent, or Firm*—J. W. Herndon; S. J. Phillips

[57] ABSTRACT

A microprocessor system that provides protection against memory violations by interrupting the central processing unit (CPU). A problem arises when the interrupt itself causes memory violations in push-down stack operations. This problem is solved by providing an auxiliary memory to store stack overflow data. Memory violations are detected (30, 40) and overflow data is written (42, 60, 33, 100) into auxiliary memory, at sequential locations (50, 51, 60). An interrupt signal is returned (30, 20) to the CPU. A stack overflow interrupt program reads the number of locations written (50, 80, 90), and accesses the auxiliary memory (100, 60, 70, 90) to determine and correct the cause of the overflow.

7 Claims, 2 Drawing Figures

AUXILIARY MEMORY FOR MICROPROCESSOR STACK OVERFLOW

TECHNICAL FIELD

This invention relates to computer systems equipped with memory protection, and more particularly, to microprocessors equipped with memory management features.

BACKGROUND OF THE INVENTION

Microprocessors are powerful processing devices, but they are limited by present technology as to size and circuit density. As a result of these limitations certain desirable processor features such as memory management are presently provided by circuitry external to the microprocessor itself.

One of the important functions of memory management is the detection of memory protection violations. That is, the memory management circuitry determines when the microprocessor is attempting to access a location in protected memory and notifies the microprocessor so that appropriate action can be taken. In the prior art, this notification has been accomplished with a memory "exception" control signal. The memory management circuitry operates early in the microprocessor instruction decoding cycle so that a memory violation is detected early, the exception signal is returned, and the offending instruction is aborted before it can be completed. See, for example, the article by Lavi, et al, "16-bit Microprocessor Enters Virtual Memory Domain", *Electronics*, Apr. 24, 1980. The instruction aborting facility is described at pages 126-128.

In order for memory exception to operate as stated, the microprocessor must be designed from its inception to accept the exception signal and to abort instructions. Many microprocessors in current use, however, do not provide for a memory exception signal and are not capable of aborting instructions. It is desirable that these microprocessors, too, be provided with memory management features.

In the present invention, memory management is provided to the microprocessor by external circuitry that notifies the microprocessor of memory violations by means of a microprocessor "interrupt" signal. Currently available microprocessors are commonly provided with interrupt capabilities, so that the present invention finds utility for a large class of devices.

Unlike the memory exception, an interrupt can take place only at the end of an instruction execution cycle, so that any instruction causing memory violation is completely executed. The memory management circuitry blocks the access attempt by the instruction, then interrupts the microprocessor at the end of the execution cycle of the offending instruction. The interrupt program may then take steps to compensate for the actions taken by the offending instruction.

A particular problem with interrupt-driven memory management arises when the microprocessor is equipped to operate a push-down stack in memory for interrupt and other data. A push-down stack by its nature is extendible and may dynamically grow beyond the limited memory area set aside for stack use. The interrupt causes data to be placed on the push-down stack and may itself cause a memory violation. The interrupt process is non-interruptible so that the interrupt will go to completion and the interrupt data will be sent out to memory whether or not memory violations are occurring. The interrupt data is important if program sanity is to be maintained, but it cannot be written beyond the stack area because it may destroy other important data. Succinctly put, the problem attacked by the present invention is the problem of providing for interrupt stack overflow in an interrupt-driven memory protection system.

SUMMARY OF THE INVENTION

The problem is solved in the present invention by providing an auxiliary memory to store stack overflow data. Stack overflow is detected by the memory management unit, and the overflow data is diverted to the auxiliary memory. An address counter provides the write address for auxiliary memory. This counter is incremented as necessary so that multiple stack writes, such as occur during an interrupt, can be accommodated. An alternate means of access to the auxiliary memory is provided so that the microprocessor can read and write the auxiliary memory. This permits a stack overflow interrupt program to analyze the overflow data and to relieve the conditions leading to stack overflow.

DETAILED DESCRIPTION

Figure 1:
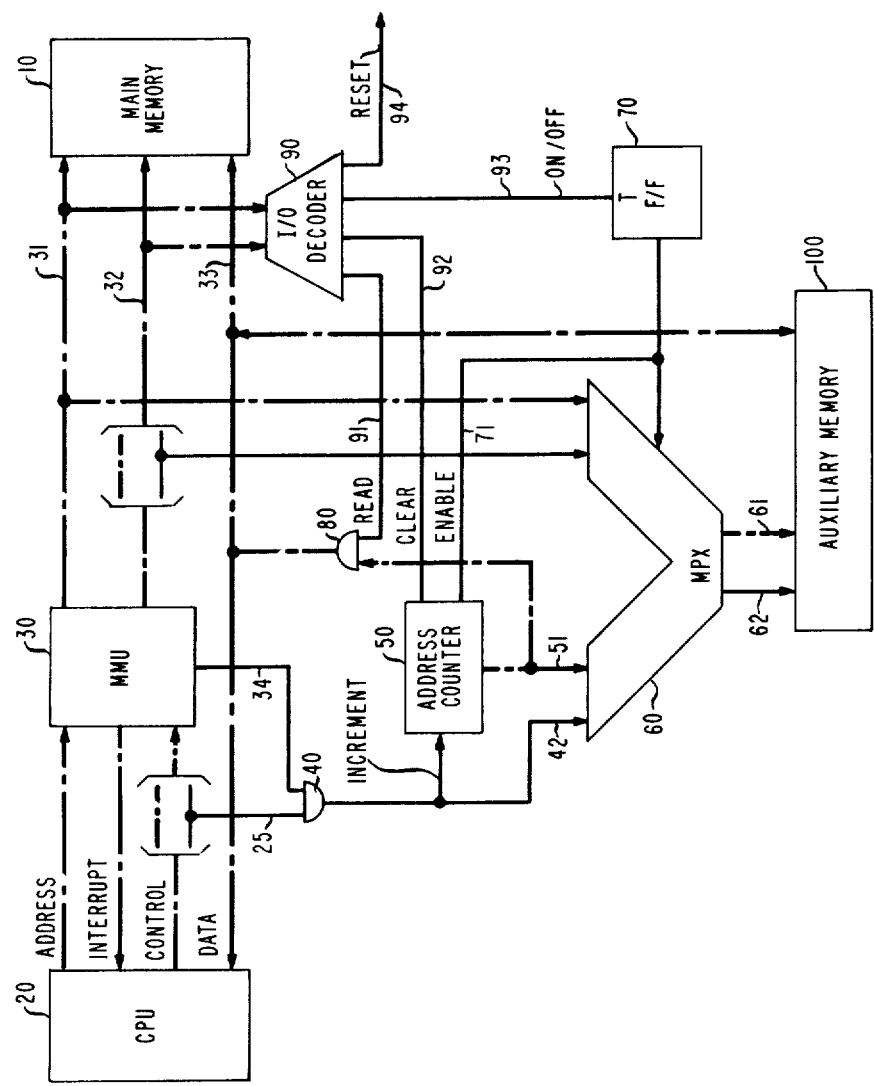
FIG. 1 shows an embodiment of the present invention, a computer system including central processor and memory units.

In FIG. 1, read-write, random-access main memory 10 provides data storage for central processing unit (CPU) 20. This CPU may be of the microprocessor type, for example, it may include a model 8086 microprocessor manufactured by Intel Corporation and related devices from the 8086 family such as clock, bus controller, address latch, data bus transceiver, and priority interrupt controller. For additional details, see *The 8086 Family User's Manual*, Intel Corporation, October 1979, which is incorporated herein by reference. Memory address and control signals from the CPU are first processed by memory management unit (MMU) 30, to be described in detail with respect to FIG. 2. The MMU provides for mapping of CPU addresses into main memory addresses, for decoding of CPU control signals, and for protection of main memory areas. A CPU-alterable memory map within the MMU converts CPU addresses into main memory addresses and protection information. In this way, for example, a greater number of main memory locations may be provided and utilized by the CPU than can be addressed directly by the CPU address bus, and specified areas of memory 10 may be protected from being overwritten. Memory mapping forms no part of the present invention, and no further details will be presented here. For additional details see the article by Roloff, "Managing Memory to Unloose the Full Power of Microprocessors," *Electronics*, Apr. 10, 1980, page 130.

MMU 30 detects attempts by the CPU to access protected areas of main memory and interrupts the CPU by returning interrupt signals on the cable shown. Mapped address bus 31 carries the address that results from memory mapping from MMU 30 to main memory 10. Control signal bus 32 carries CPU control signals such as read/write, timing, and chip select from MMU 30 to main memory 10, as well as decoded memory, I/O and stack control signals. When memory protection is being enforced by the MMU, it blocks appropriate control signals to prevent main memory 10 from accessing protected memory locations. Bidirectional data bus 33 carries data being read from or written into main memory 10.

Auxiliary memory 100 is provided principally for the stack overflow protection feature to be described. However, a memory 100 also can be accessed in the same fashion as memory 10 to provide additional memory capacity, provided that on/off flip-flop 70 is in the reset, or "off" condition, indicating that the stack overflow protection feature is turned off. With flip-flop 70 reset, multiplexor 60 gates the address signals from mapped address bus 31 to address bus 61 of auxiliary memory 100, and gates the read/write control signal from control bus 32 to read/write control lead 62 of auxiliary memory 100. Data bus 33 connects also to the data leads of auxiliary memory 100. This memory is internally strapped to respond to addresses different from those of main memory 10.

CPU 20 has an internal architecture that provides push-down memory stack functions during interrupt operations. Such a stack is an area of contiguous memory locations external to the CPU, but addressed with an internal CPU stack pointer. When an interrupt takes place, interrupt-related information—such as the program status of the interrupted program, the interrupt return program address, and so forth—is written into a push-down memory stack in main memory 10. CPU 20 may also provide specific instructions by which a user can read or write data on one or more push-down stacks in memory 10. In any event, in response to a push-down stack access operation, the CPU obtains the current stack pointer address from an internal register and gates the address onto the CPU address bus along with stack read/write control signals on the control bus. The address participates in the memory mapping and protection features provided by MMU 30. If the stack pointer address falls within a protected memory area, for example, if the stack pointer is too large (or too small) and the attempted access will fall outside the limited memory area provided for the stack, MMU 30 blocks the control signals from reaching memory 10, and supplies a stack overflow (stack fault) signal on lead 34. Read/write signal on lead 35 from CPU 20 indicates that a read or a write operation is about to occur. These two signals are combined at gate 40 from which output lead 42 provides a read/write control signal to multiplexor 60. The output leads 51 of counter 50 are coupled to multiplexor 60. In the event of a write operation, the write control signal on lead 42 also serves to increment address counter 50. In the event of a read operation, the signal on lead 42 does not affect counter 50.

When on/off flip-flop 70 is in the set, or "on" condition, indicating that the stack overflow protection feature is turned on, the read/write control signal from lead 42 is gated by multiplexor 60 to read/write control lead 62 of auxiliary memory 100, and the address counter signals from leads 51 are gated by multiplexor 60 to address bus 61 of auxiliary memory 100.

Out-of-bound stack access operations are thus intercepted and redirected to auxiliary memory 100. In particular, an out-of-bound stack write operation is prevented from taking place in main memory 10, but takes place instead in auxiliary memory 100 at a location specified by counter 50. The counter advantageously begins in the clear or all zeros condition so that the memory 100 location with the lowest address is the first to be used. The high order address bits of leads 51 are advantageously strapped to match the internal strapping of memory 100, while the low order address bits are provided by counter 50. Counter 50 will be incremented during the write operation, so that multiple successive out-of-bound stack write operations will take place at multiple successive locations in memory 100.

Figure 2:
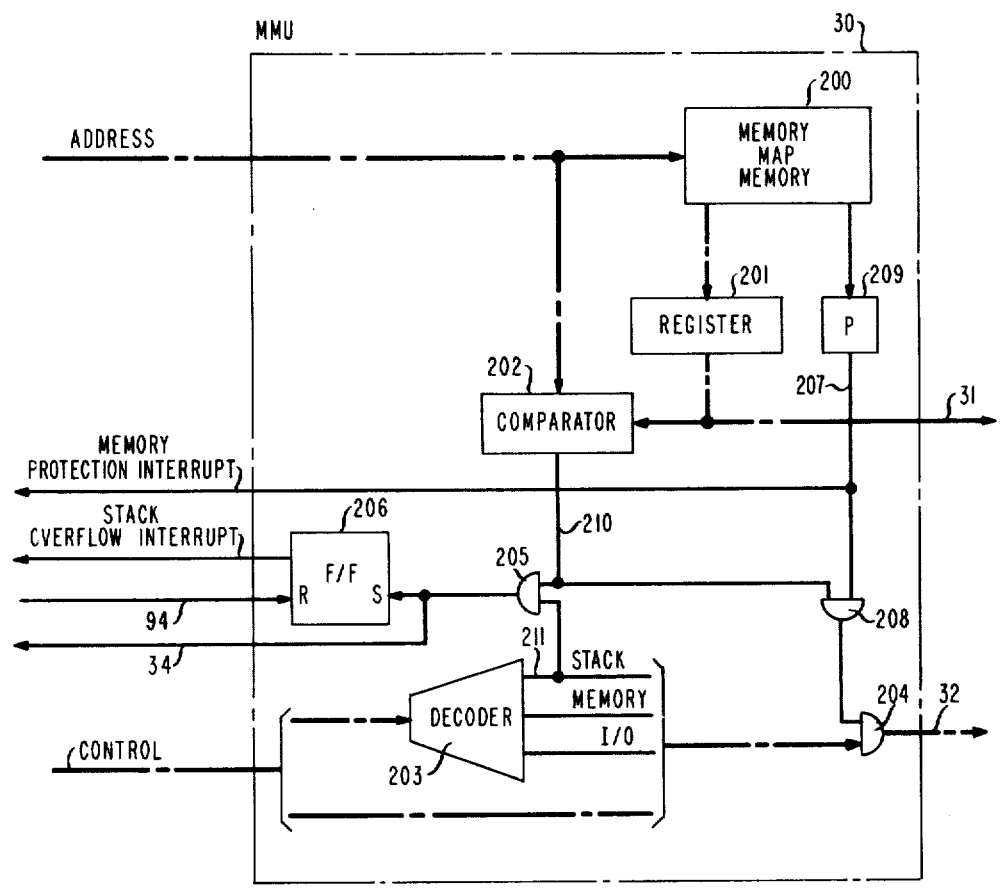
FIG. 2 shows details of memory management unit 30.

FIG. 2 details the memory protection features of memory management unit (MMU) 30. Memory map memory 200 provides table look-up of the CPU address to convert it to a main memory address, stored in address output register 201, and a memory area protection unit, stored in protection register 209. An attempt by CPU 20 to access a protected memory area will read protection information into register 209 and produce a signal on lead 207. This will activate gate circuits 208 and 204 to block control signals from appearing on bus 32, thereby blocking access to memory 10, and will return a memory protection interrupt signal to CPU 20.

Register 201 supplies the mapped memory address to bus 31 and to comparator 202. The comparator compares the lower order bits of the input address with those of the mapped address and detects attempts by the CPU to access areas of main memory 10 that may not be specifically protected by a memory protection bit but, nonetheless, are outside a specified area, for example, outside the specified stack area. As a result of an attempt by CPU 20 to access a location outside the stack area, comparator 202 detects the out-of-bound address and produces a signal on lead 210 that activates circuits 208 and 204 to block access to memory 10 as described. Decoder 203 decodes control signals from CPU 20 and identifies the access request as a stack operation, producing a signal on lead 211. Gate circuit 205 combines the signals from leads 210 and 211 to produce a signal indicating stack overflow is about to occur. This stack overflow signal sets stack overflow interrupt request flip-flop 206. The overflow signal is carried on lead 34 with the effect previously described with respect to FIG. 1.

The setting of flip-flop 206 will cause an interrupt request signal to be returned to CPU 20 on the lead shown. Response to this stack overflow interrupt request may be delayed by the CPU for several machine cycles as needed to complete the present CPU activity. This can occur, for example, when stack overflow is caused by a multiple stack write operation such as an interrupt or a CPU instruction (if any) that causes multiple stack writes.

The original interrupt or the original CPU instruction that causes stack overflow to occur will go to completion with its overflow data being written into memory 100. When this original interrupt or instruction is completed, the stack overflow interrupt requested by flip-flop 206 will be granted by CPU 20, and the stack overflow interrupt will take place with its overflow data being written also into auxiliary memory 100 at succeeding locations as specified by address counter 50. Thus, the original interrupt or the original CPU instruction overflow data will appear in memory 100 followed by the stack interrupt overflow data for analysis by the stack overflow interrupt program. The value of counter 50 advantageously will be equal to the number of locations in memory 100 that have been used for overflow data.

The original interrupt may come from any of a variety of interrupt sources, for example, a timer, peripheral input/output device, internal CPU events such as divide check, MMU memory protection circuitry other than stack overflow, or other interrupt source. Providing for a variety of competing interrupt requests on an interrupt priority basis is well understood in the prior art, and this description will not be burdened with its detail. In the present illustrative embodiment including the 8086 microprocessor, it is convenient to use the nonmaskable interrupt feature of the 8086 to implement the stack overflow interrupt request. However, any interrupt type will be adequate so long as its priority is suitable to cause the CPU to execute the stack overflow interrupt program at the appropriate time.

Returning now to FIG. 1, the stack overflow interrupt program first resets flip-flop 70 to gain read/write access to auxiliary memory 100 through multiplexor 60 in the manner previously described. Resetting flip-flop 70 also serves to freeze the contents of address counter 50 by removing an enable signal that is provided by flip-flop 70 over lead 71 when flip-flop 70 is in the set condition. The stack overflow interrupt program then reads the contents of address counter 50 in order to determine the number of overflow stack locations used in auxiliary memory 100. Gating circuit 80 gates the contents of counter 50 to data bus 33 in response to a read signal from I/O decoder 90. Decoder 90 responds to input/output instructions from CPU 20. The occurrence of an I/O read or I/O write instruction is detected by decoder 203 within MMU 30 and transmitted to decoder 90 over bus 32. Address information from the I/O instructions appearing on bus 31 is combined with the appropriate I/O read or I/O write signal in decoder 90 to produce a counter read signal on lead 91, a counter clear signal on lead 92, a flip-flop toggle signal on lead 93, or a flip-flop reset signal on lead 94. With the information read out of counter 50 as to the number of stack locations stored away in memory 100, the stack overflow interrupt program can interpret the stack data in memory 100, and can take action known in the prior art to expand the size of the stack area in main memory 10, or relocate the stack into a more capacious area of memory 10 as appropriate. Counter 50 is then cleared so that subsequent stack-overflow writes will begin at the location of lowest address in auxiliary memory 100, flip-flop 70 is then toggled to the set condition in order to turn overflow protection on and enable counter 50, flip-flop 206 (FIG. 2) is reset to clear to stack overflow interrupt request, and finally the stack overflow interrupt program returns to the program interrupted.

What is claimed is:

1. A computer system comprising
a central processing unit (CPU),
a main memory having protected areas of storage and unprotected areas of storage and a memory block of defined size in an unprotected area for storing CPU interrupt data,
an auxiliary memory,
means for detecting an attempt by the CPU to write data into a protected area of the main memory and for interrupting the CPU in response thereto,
means for detecting an overflow of the memory block occurring during the storing of interrupt data in the memory block, and
means responsive to the last-mentioned detecting means for writing the overflow data into the auxiliary memory.

2. A computer system as set forth in claim 1
wherein said means for writing further includes
means for writing a plurality of said data into a corresponding plurality of locations in the auxiliary memory.

3. A computer system as set forth in claim 2 further comprising
means responsive to said means for writing said plurality of data for communicating to the CPU the quantity of data written.

4. A computer system as set forth in claim 1 further comprising
means for providing read/write access to the auxiliary memory by the CPU.

5. A computer system as set forth in claim 4
further comprising
means responsive to control data from the CPU for enabling said means for writing data into the auxiliary memory
and for enabling, in the alternative, said means for providing read/write access.

6. A computer system as set forth in claim 1
wherein said means for writing further includes
means for writing a plurality of said data in a corresponding plurality of locations in the auxiliary memory,
and said computer system further comprises
means for providing read/write access to the auxiliary memory by the CPU, and
means for enabling said means for writing data into the auxiliary memory and said means for writing a plurality of data,
and for enabling, in the alternative, said means for providing read/write access.

7. A computer system comprising
a central processing unit (CPU) controllable by interrupts,
a main memory having a storage block for storing interrupt data from the CPU during an interrupt,
an auxiliary memory,
means for detecting an overflow state of the storage block during the storing of CPU interrupt data therein, and
means responsive to the detecting means for diverting the overflow data to the auxiliary memory.

* * * * *